United States Patent [19]

Reiffenrath et al.

[11] Patent Number: 4,897,216
[45] Date of Patent: Jan. 30, 1990

[54] 2,3-DIFLUOROPHENOL DERIVATIVES

[75] Inventors: Volker Reiffenrath, Rossdorf; Joachim Krause, Dieburg; Andreas Wächtler, Griesheim; Georg Weber, Erzhausen; Thomas Geelhaar, Mainz, all of Fed. Rep. of Germany

[73] Assignee: Merck Patent Gesellschaft mit Beschränkter Haftung, Darmstadt, Fed. Rep. of Germany

[21] Appl. No.: 321,046

[22] Filed: Mar. 9, 1989

[30] Foreign Application Priority Data

Mar. 10, 1988 [DE] Fed. Rep. of Germany ....... 3807819

[51] Int. Cl.$^4$ .................. G02F 1/13; C09K 19/30; C09K 19/20; C07C 69/773
[52] U.S. Cl. .................. 252/299.63; 252/299.01; 252/299.65; 252/299.67; 350/350 R; 350/350 S; 560/59; 560/60; 560/64; 560/65; 560/73; 560/102; 560/104; 560/106; 560/109
[58] Field of Search .................. 252/299.63, 299.67, 252/299.65, 299.01; 350/350 R, 350 S; 560/59, 60, 64, 65, 73, 102, 104, 106, 109

[56] References Cited

U.S. PATENT DOCUMENTS

| | | | |
|---|---|---|---|
| 3,915,883 | 10/1975 | Van Meter et al. | 252/299.64 |
| 4,009,934 | 3/1977 | Goodwin et al. | 350/350 R |
| 4,256,656 | 3/1981 | Beguim et al. | 252/299.67 |
| 4,279,770 | 7/1981 | Imukai et al. | 252/299.65 |
| 4,368,135 | 1/1983 | Osman | 252/299.63 |
| 4,602,851 | 7/1986 | Jenner et al. | 252/299.63 |
| 4,637,897 | 1/1987 | Kelly et al. | 252/299.63 |
| 4,710,315 | 12/1987 | Schab et al. | 252/299.63 |
| 4,744,918 | 5/1988 | Heppke et al. | 252/299.65 |
| 4,808,333 | 2/1989 | Huynh-Ba et al. | 252/299.63 |

FOREIGN PATENT DOCUMENTS

| | | |
|---|---|---|
| 0084194 | 7/1983 | European Pat. Off. |
| 2939782 | 4/1981 | Fed. Rep. of Germany .................. 252/299.65 |
| 2098986 | 12/1982 | United Kingdom .......... 252/299.67 |

OTHER PUBLICATIONS

Osman, M. A., Mol. Cryst., Lir Gryst., vol. 82, (Lett.), pp. 295-302, (1982).

*Primary Examiner*—Teddy S. Gron
*Attorney, Agent, or Firm*—Millen, White & Zelano

[57] ABSTRACT

2,3-Difluorophenol derivatives of the formula

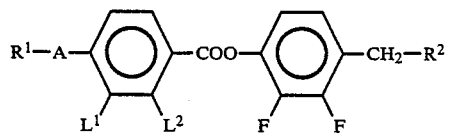

wherein
$R^1$ and $R^2$, in each case independently of one another, are an alkyl group having 1 to 15 C atoms in which, in addition, one or two nonadjacent $CH_2$ groups may be replaced by —O—, —CO—, —CH=CH— and/or —C≡C—;
A is 1,4-phenylene which is unsubstituted or substituted by one or two fluorines, or is trans-1,4-cyclohexylene or a single bond; and
$L^1$ and $L^2$, in each case independently of one another, are H or F, are suitable as components of liquid-crystalline media.

17 Claims, No Drawings

2,3-DIFLUOROPHENOL DERIVATIVES

SUMMARY OF THE INVENTION

The invention relates to 2,3-difluorophenol derivatives of the formula I

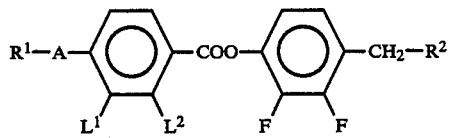

in which
- $R^1$ and $R^2$, in each case independently of one another, are an alkyl group having 1 to 15 C atoms in which, in addition, one or two non-adjacent $CH_2$ groups may be replaced by $-O-$, $-CO-$, $-CH=CH-$ and/or $-C\equiv C-$,
- A is 1,4-phenylene which is unsubstituted or substituted by one or two fluorines, or is trans-1,4-cyclohexylene or a single bond, and
- $L^1$ and $L^2$, in each case independently of one another, are H or F.

For reasons of simplicity below, Cyc is a 1,4-cyclohexylene group and Phe is a 1,4-phenylene group, where this group can be unsubstituted or substituted by one or two fluorines. These Phe groups are preferably unsubstituted. $PheF_2$ is a group of the formula,

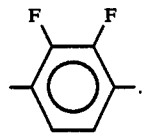

The compounds of the formula I can be used as components of liquid-crystalline media, in particular for displays based on the principle of the twisted cell, the guest-host effect, the effect of deformation of aligned phases or the effect of dynamic scattering.

The compounds of the formula I are distinguished by a clearly negative anisotropy of the dielectric constant and, in an electrical field, are aligned with their longitudinal molecular axes perpendicular to the field direction. This effect is known and is utilized to control the optical transparency in various liquid-crystal displays, for example in liquid-crystal cells of the light-scattering type (dynamic scattering), of the so-called DAP type (deformation of aligned phases) or ECB type (electrically controlled birefringence) or of the guest/host type (guest/host interaction).

Compounds of the formula I are also suitable as components of chiral tilted smectic media. Chiral tilted smetic liquid-crystalline media having ferroelectric properties can be prepared by adding a suitable chiral dope to base mixtures having one or more tilted smetic media (L. A. Veresnev et al., Mol. Cryst. Liq. Cryst. 89, 327 (1982); H. R. Brand et al., J. Physique 44 (Lett.), L-771 (1983). These media can be used as dielectrics for rapidly switching displays which are based on the principle of SSFLC technology described by Clark and Lagerwall (N. A. Clark and S. T. Lagerwall, Appl. Phys. Lett. 36, 899 (1980); U.S. Pat. No. 4,367,924) based on the ferroelectric properties of the chiral tilted medium.

A number of liquid-crystalline compounds having slightly negative dielectric anisotropy have already been synthesized in the past. In contrast, relatively few liquid-crystal components having a large negative anisotropy of the dielectric constant are known. In addition, the latter generally have disadvantages, such as, for example, poor solubility in mixtures, high viscosity, high melting points and chemical instability. There is therefore a demand for further compounds having a negative dielectric anisotropy which allow the properties of mixtures to be further improved for a very wide variety of electrooptical applications.

Liquid-crystal compounds having a negative dielectric anisotropy and containing two or three rings linked via carboxyl groups or covalent bonds and containing one or more side groups, such as halogen, cyano or nitro groups, are known from DE 2,240,864, DE 2,613,293, DE 2,835,662, DE 2,836,086 and EP 023,728.

In EP 084,194, a broad formula covers the compounds claimed here. However, no individual compounds of the formula according to the invention are mentioned therein. It would therefore be possible for those skilled in the art neither to deduce in a simple manner from the prior art possible syntheses for the compounds claimed nor to recognize that the compounds according to the invention have mesophase ranges predominantly in a favorable position and are distinguished by a large negative anisotropy of the dielectricity and at the same time low viscosity.

Neither is there any mention of the possible use of the compounds according to the invention in displays which are based on SSFLC technology, since the compounds claimed therein have low smectic tendencies.

In addition, dibenzoic acid esters of 2,3-dichlorohydroquinone are known (for example Bristol et al., J. Org. Chem. 39, 3138 (1974) or Clanderman et al., J. Am. Chem. Soc. 97, 1585 (1975)), but these are monotropic or have very narrow mesophase ranges. The esters of 4-hydroxy-2,3-dichlorobenzoic acid described by Eidenschink et al. (Angew. Chem. 89, 103 (1977)) Likewise have only narrow mesophase ranges.

Due to their high viscosity, the 4-alkyl-2,3-dichlorophenyl-4'-alkylbicyclohexyl-4-carboxylic acid esters known from German Offenlegungsschrift 2,933,563 cannot be used industrially.

An object of the invention is to provide stable, liquid-crystalline or mesogenic compounds having a large negative anisotropy of the dielectricity and at the same time low viscosity.

Upon further study of the specification and appended claims, further objects and advantages of this invention will become apparent to those skilled in the art.

It has been found that the compounds of the formula I are preeminently suitable as components of liquid-crystalline media. In particular, they can be used to prepare stable liquid-crystalline media having a broad mesophase range and comparatively low viscosity.

The compounds of the formula I are also suitable as components of chirally tilted smectic liquid-crystalline media.

In addition, the provision of the compounds of the formula I very generally substantially broadens the range of liquid-crystalline substances which are suitable, from various applicational points of view, for the preparation of liquid-crystalline mixtures.

The compounds of the formula I have a broad field of application. Depending on the choice of substituents, these compounds can be used as base materials from which liquid-crystalline media are predominantly composed; however, it is also possible to add compounds of the formula I to liquid-crystalline base materials from other classes of compound in order, for example, to vary the dielectric and/or optical anisotropy and/or the viscosity and/or the spontaneous polarization and/or the phase ranges and/or the tilt angle and/or the pitch of a dielectric of this type.

The compounds of the formula I are furthermore suitable as intermediates in the preparation of other substances which can be used as components of liquid-crystalline dielectrics.

In the pure state, the compounds of the formula I are colorless and form liquid-crystalline mesophases in a temperature range in a favorable position for electro-optical use. They are very stable chemically, thermally and to light.

The invention thus relates to the compounds of the formula I and to a process for their preparation, characterized in that an appropriate carboxylic acid or a reactive derivative thereof is reacted with an appropriate hydroxyl compound or a reactive derivative thereof.

The invention moreover relates to the use of the compounds of the formula I as components of liquid-crystalline media. The invention furthermore relates to liquid-crystalline media containing at least one compound of the formula I, and to liquid-crystal display elements which contain media of this type. Media of this type have particularly advantageous elastic constants, and, due to their low $\Delta\epsilon/\epsilon\perp$ values, are particularly suitable for TFT mixtures.

Above and below, $R^1$, $R^2$, A and L have the meaning indicated, unless expressly stated otherwise.

The compounds of the formula I accordingly cover compounds having two rings, of the sub-formulae Ia and compounds having three rings, of the sub-formula Ib and Ic

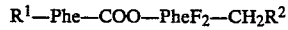

$R^1$—Phe—COO—PheF$_2$—CH$_2$R$^2$    Ia

$R^1$—Phe—Phe—COO—PheF$_2$—CH$_2$R$^2$    Ib

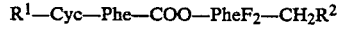

$R^1$—Cyc—Phe—COO—PheF$_2$—CH$_2$R$^2$    Ic

In the compounds of the formulae above and below, $R^1$ and $R^2$ are preferably alkyl or alkoxy.

Further preferred compounds are those of the formulae above and below in which one of the radicals $R^1$ and $R^2$ is alkenyl or oxaalkyl (for example alkoxymethyl).

A is preferably unsubstituted 1,4-phenylene or Cyc.

In the formulae above and below, $R^1$ and $R^2$ preferably have 2–12 C atoms, in particular 3–10 C atoms. It is also possible for one or two CH$_2$ groups in $R^1$ and $R^2$ to have been replaced. Preferably, only one CH$_2$ group has been replaced, by —O— or —CH=CH—.

In the formulae above and below, $R^1$ and $R^2$ are preferably alkyl, alkoxy or another oxaalkyl group, furthermore also alkyl groups in which one or two CH$_2$ groups may be replaced by —CH=CH—.

If $R^1$ and $R^2$ are alkyl radicals in which, in addition, one ("alkoxy" or "oxaalkyl") or two ("alkoxyalkoxy" or "dioxaalkyl") non-adjacent CH$_2$ groups may be replaced by 0 atoms, they may be straight-chain or branched. They are preferably straight-chain, have 2, 3, 4, 5, 6 or 7 C atoms and are accordingly preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy, or tetradecoxy.

Oxaalkyl is preferably straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 6-, 7-, 8- or 9-oxadecyl, 1,3-dioxabutyl (=methoxymethoxy), 1,3-, 1,4- or 2,4-dioxapentyl, 1,3-, 1,4-, 1,5-, 2,5- or 3,5-dioxahexyl, 1,3-, 1,4-, 1,5-, 1,6-, 2,4-, 2,5-, 2,6-, 3,5-, 3,6- or 4,6-dioxaheptyl.

If $R^1$ and $R^2$ are an alkyl radical in which one CH$_2$ group has been replaced by —CH=CH—, the trans form is preferred. This alkenyl radical may be straight-chain or branched. It is preferably straight-chain and has 2 to 10 C atoms. Accordingly, it is particularly vinyl, prop-1-or prop-2-enyl, but-1-, -2- or -3-enyl, pent-1-, -2-, -3-or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

Due to improved solubility in the customary liquid-crystalline base materials, compounds of the formula I having branched wing groups $R^1$ and $R^2$ may occasionally be of importance, but in particular as chiral dopes if they are optically active. Smectic compounds of this type are suitable as components for ferroelectric materials.

Branched groups of this type generally contain not more than one chain branch. Preferred branched radicals $R^1$ or $R^2$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl, 3-oxa-4-methylpentyl, 4-methylhexyl, 2-nonyl, 2-decyl, 2-dodecyl and 6-methyloctoxy.

Formula I covers the racemates of these compounds and the optical antipodes, and mixtures thereof.

Of the compounds of the formula I and Ia to Ic, those are preferred in which at least one of the radicals present therein has one of the preferred meanings indicated.

The compounds of the formula I are prepared by methods known per se, as described in the literature (for example in the standard works such as Houben-Weyl, Methoden der Organischen Chemie, Georg-Thieme-Verlag, Stuttgart), to be precise under reaction conditions which are known and suitable for the reactions mentioned. At the same time, use can also be made of variants which are known per se, but are not mentioned in greater detail here.

If desired, the starting materials can also be formed in situ by not isolating them from the reaction mixture, but instead immediately reacting them further to form the compounds of the formula I.

The compounds of the formula I are accessible starting from 1,2-difluorobenzene. The latter is metallated by known processes (for example A. M. Roe et al., J. Chem. Soc. Chem. Comm., 22, 582 (1965)) and reacted with the appropriate electrophile. This reaction sequence can be carried out a second time with the 1-R$^2$-2,3-difluorobenzene obtained in this way, for example using tert.-butyl hydroperoxide as the electrophile, thus giving 2,3-difluoro-4-R$^2$-phenols. 1,2-difluorobenzene or 1-R$^2$-2,3-difluorobenzene is reacted with phenyllithium, lithium tetramethylpiperidine, or n-, sec- or tert-butyllithium at temperature of from −100° C. to +50° C., preferably −78° C. to 0° C., in an inert solvent, such as diethyl ether, tetrahydrofuran, dimethoxyethane, tert-butyl methyl ether or dioxane, hydrocarbons, such as hexane, heptane, cyclohexane, benzene or toluene, or mixtures of these solvents, if appropriate with addition of a complexing agent, such as tetramethylethylenediamine (TMEDA) or hexamethylphosphoric triamide.

The lithium 2,3-difluorophenyl compounds are reacted with the appropriate electrophiles at −100° C. to 0° C., preferably at −50° C. Suitable electrophiles are aldehydes, ketones, nitriles, epoxides, carboxylic acid derivatives such as esters, anhydrides or halides, haloformic acid esters or carbon dioxide.

For reaction with aliphatic or aromatic halogen compounds, the lithium 2,3-difluorophenyl compounds are transmetallated and coupled with transition-metal catalysis. Zinc 2,3-difluorophenyl (cf. German Offenlegungsschrift 3,632,410) or titanium 2,3-difluorophenyl compounds (cf. German Offenlegungsschrift 3,736,489) are particularly suitable for this purpose.

The compounds of the formula I can be prepared by esterification of corresponding carboxylic acids for reactive derivatives thereof) using alcohols or phenols (or reactive derivatives thereof).

Suitable reactive derivatives of the carboxylic acids mentioned are, in particular, the acyl halides, above all the chlorides and bromides, furthermore the anhydrides, for example also mixed anhydrides, azides or esters, in particular alkyl esters having 1–4 C atoms in the alkyl group.

Suitable reactive derivatives of the alcohols or phenols mentioned are, in particular, the corresponding metal alcoholates or phenolates, preferably of an alkali metal such as Na or K.

The esterification is advantageously carried out in the presence of an inert solvent. Highly suitable solvents are in particular, ethers, such as diethyl ether, di-n-butyl ether, THF, dioxane or anisole, ketones, such as acetone, butanone or cyclohexanone, amides, such as DMF or hexamethylphosphoric triamide, hydrocarbons, such as benzene, toluene or xylene, halogenated hydrocarbons, such as carbon tetrachloride or tetrachloroethylene, and sulfoxides, such as dimethyl sulfoxide or sulfolane. Water-immiscible solvents can at the same time advantageously be used for removal by azeotropic distillation of the water formed during esterification. Occasionally, it may also be possible to use an excess of an organic base, for example pyridine, quinoline or triethylamine, as the solvent for the esterification. The esterification can also be carried out in the absence of a solvent, for example by simply heating the components in the presence of sodium acetate. The reaction temperature is usually between −50° and +250°, preferably between −20° and +80°. At these temperatures, the esterification reactions are generally complete after 15 minutes to 48 hours. In detail, the reaction conditions for the esterification depend substantially on the nature of the starting materials used. Thus, the reaction of a free carboxylic acid with a free alcohol or phenol is generally carried out in the presence of a strong acid, for example a mineral acid, such as hydrochloric acid or sulphuric acid. A preferred reaction procedure is to react to acid anhydride or, in particular, an acyl chloride with an alcohol, preferably in a basic medium, important bases being, in particular, alkali metal hydroxides, such as sodium hydroxide or potassium hydroxide, alkali metal carbonates or hydrogen carbonates, such as sodium carbonate, sodium hydrogen carbonate, potassium carbonate or potassium hydrogen carbonate, alkali metal acetates, such as sodium acetate or potassium acetate, alkaline earth metal hydroxides, such as calcium hydroxide, or organic bases, such as triethylamine, pyridine, lutidine, collidine or quinoline. A further preferred embodiment of the esterification comprises first converting the alcohol or the phenol, for example by treatment with ethanolic sodium hydroxide solution or potassium hydroxide solution, into the sodium alcoholate or phenolate or potassium alcoholate or phenolate, isolating and suspending the latter with stirring in acetone or diethyl ether together with sodium hydrogen carbonate or potassium carbonate, and adding a solution of the acyl chloride or anhydride in diethyl ether, acetone, or DMF, expediently at temperatures between about −25° and +20°.

Besides to one or more compounds according to the invention, the liquid-crystalline media according to the invention preferably contain, as further components, 2 to 40, in particular 4 to 30, components. Besides one or more compounds according to the invention, these media very particularly preferably contain 7 to 25 components. These further components are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylcyclohexanecarboxylates, cyclohexylphenyl benzoates, cyclohexanecarboxylates or cyclohexylcyclohexanecarboxylates, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl-or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds which are suitable as further components of media according to the invention can be characterized by the formulae 1, 2, 3, 4 and 5:

R'—L—E—R''      1

R'—L—COO—E—R''      2

R'—L—OOC—E—R''      3

R'—L—CH$_2$CH$_2$—E—R''      4

R'—L—C≡C—E—R''      5.

In the formulae 1, 2, 3, 4 and 5, L and E, which may be identical or different, are, in each case independently of one another, a bivalent radical from the group formed from —Phe—, —Cyc—, —Phe—Phe—, —Phe—Cyc—, —Cyc—Cyc—, —Pyr—, —Dio—, —G—Phe— and —G—Cyc— and the mirror images thereof, where Phe is 1,4-phenylene which is unsubstituted or substituted by fluorine, Cyc is trans-1,4- cyclohexylene or 1,4-cyclohexenylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The media according to the invention preferably contain one or more components selected from the compounds of the formulae 1, 2, 3, 4 and 5 in which L and E are selected from the group comprising Cyc, Phe and Pyr and simultaneously one or more components selected from the compounds of the formulae 1, 2, 3, 4 and 5 in which one of the radicals L and E is selected from the group comprising Cyc, Phe and Pyr and the other radical is selected from the group comprising —Phe—Phe—, —Phe—Cyc—, —Cyc—Cyc—, —G—Phe— and —G—Cyc—, and optionally one or more components selected from the compounds of the formulae 1, 2, 3, 4 and 5 in which the radicals L and E are selected from the group comprising —Phe—Cyc—, —Cyc—Cyc—, —G—Phe—and —G—Cyc—.

In a preferred sub-group of the compounds of the formulae 1, 2, 3, 4 and 5, R' and R", in each case independently of one another, are alkyl, alkenyl, alkoxy, alkenyloxy or alkanoyloxy having up to 8 carbon atoms (group 1). In most of these compounds, R' and R" are different from one another, one of these radicals usually being alkyl or alkenyl. In a further preferred sub-group of the compounds of the formulae 1, 2, 3, 4 and 5, R" is —CN, —CF$_3$, F, Cl or —NCS, while R has the meaning indicated in the case of the compounds of group 1 and is preferably alkyl or alkenyl (group 2). However, other variants of the proposed substituents in the compounds of the formulae 1, 2, 3, 4 and 5 are common. Many substances of this type or alternatively mixtures thereof are commercially available. All these substances can be obtained by methods known from the literature or analogously thereto.

Besides components from group 1, the media according to the invention preferably also contain components from group 2, whose proportions are preferably as follows:

Group 1: 20 to 90%, in particular 30 to 90%,
Group 2: 10 to 80%, in particular 10 to 50%,
the sum of the proportions of the compounds according to the invention and of the compounds from groups 1 and 2 adding up to 100%.

The media according to the invention preferably contain 1 to 40%, in particular preferably 5 to 30%, of compounds according to the invention. Further preferred media are those which contain more than 40%, in particular 45 to 90%, of compounds according to the invention. The media preferably contain three, four or five compounds according to the invention.

The media according to the invention are prepared in a manner which is customary per se. In general, the components are dissolved in one another, expediently at elevated temperature. By means of suitable additives, the liquid-crystalline phases according to the invention can be modified in the manner such that they can be used in all types of liquid-crystal display elements disclosed hitherto. Additives of this type are known to those skilled in the art and are described in detail in the literature (H. Kelker/R. Hatz, Handbook of Liquid Crystals, Verlag Chemie, Weinheim, 1980). For example, pleochroic dyes can be added for the preparation of colored guesthost systems or substances can be added to modify the dielectric anisotropy, the viscosity and/or the orientation of the nematic phases.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weights.

The entire texts of all applications, patents and publications cited above and below, and of corresponding German application P 38 07 819.8, are hereby incorporated by reference.

EXAMPLES

The examples below are intended to illustrate the invention without representing a limitation. mp.=melting point, cp.=clear point. Above and below, percentages denote percent by weight; all temperatures are given in degrees Celsius. "Customary work-up" means that water is added, the mixture is extracted with methylene chloride, the organic phase is separated off, dried and evaporated, the product is purified by crystallization and/or chromatography.

In addition the abbreviations have the following meanings:

C: crystalline-solid state, S: smectic phase (the index denotes the phase type), N: nematic state, Ch: cholesteric phase, I: isotropic phase. The number between two symbols indicates the conversion temperature in degrees Celsius.

$T_M$ denotes the melting point, and $T_C$ denotes the clear point; the temperatures are given in degrees Celsius.

EXAMPLE 1

By lithiation of o-difluorobenzene at −70° to −80°, reaction with octanal, dehydration and hydrogenation, 2,3-difluorooctylbenzene is obtained. Re-metallation and reaction with N-formylpiperidine to give the aldehyde, oxidation thereof by the method of Bayer-Villiger to give the formate followed by hydrolysis gives 4-octyl-2,3-difluorophenol.

0.1 mol of the phenol and 0.1 mol of the pyridine are dissolved in 100 ml of toluene. 0.1 mol of 4-hexyloxybenzoyl chloride, dissolved in 50 ml of toluene, are added at 80°, and the mixture is stirred for 3 hours. The precipitate of pyridine hydrochloride is filtered off with suction, the toluene is distilled off, and the remaining 2,3-difluoro-4-octylphenyl 4-hexyloxybenzoate is purified by crystallization.

The following are prepared analogously:
2,3-difluoro-4-ethylphenyl 4-propylbenzoate
2,3-difluoro-4-propylphenyl 4-propylbenzoate
2,3-difluoro-4-butylphenyl 4-propylbenzoate
2,3-difluoro-4-pentylphenyl 4-propylbenzoate
2,3-difluoro-4-hexylphenyl 4-propylbenzoate
2,3-difluoro-4-heptylphenyl 4-propylbenzoate
2,3-difluoro-4-octylphenyl 4-propylbenzoate
2,3-difluoro-4-nonylphenyl 4-propylbenzoate
2,3-difluoro-4-decylphenyl 4-propylbenzoate
2,3-difluoro-4-undecylphenyl 4-propylbenzoate
2,3-difluoro-4-dodecylphenyl 4-propylbenzoate
2,3-difluoro-4-methoxymethylphenyl 4-propylbenzoate 2,3-difluoro-4-(but-3-enyl)phenyl 4-propylbenzoate
2,3-difluoro-4-ethylphenyl 4-heptylbenzoate
2,3-difluoro-4-propylphenyl 4-heptylbenzoate
2,3-difluoro-4-butylphenyl 4-heptylbenzoate
2,3-difluoro-4-pentylphenyl 4-heptylbenzoate
2,3-difluoro-4-hexylphenyl 4-heptylbenzoate
2,3-difluoro-4-heptylphenyl 4-heptylbenzoate
2,3-difluoro-4-octylphenyl 4-heptylbenzoate
2,3-difluoro-4-nonylphenyl 4-heptylbenzoate
2,3-difluoro-4-decylphenyl 4-heptylbenzoate
2,3-difluoro-4-undecylphenyl 4-heptylbenzoate
2,3-difluoro-4-dodecylphenyl 4-heptylbenzoate
2,3-difluoro-4-methoxymethylphenyl 4-heptylbenzoate
2,3-difluoro-4-(but-3-enyl)phenyl 4-heptylbenzoate
2,3-difluoro-4-ethylphenyl 4-nonylbenzoate
2,3-difluoro-4-propylphenyl 4-nonylbenzoate
2,3-difluoro-4-butylphenyl 4-nonylbenzoate
2,3-difluoro-4-pentylphenyl 4-nonylbenzoate
2,3-difluoro-4-hexylphenyl 4-nonylbenzoate
2,3-difluoro-4-heptylphenyl 4-nonylbenzoate
2,3-difluoro-4-octylphenyl 4-nonylbenzoate
2,3-difluoro-4-nonylphenyl 4-nonylbenzoate
2,3-difluoro-4-decylphenyl 4-nonylbenzoate
2,3-difluoro-4-undecylphenyl 4-nonylbenzoate
2,3-difluoro-4-dodecylphenyl 4-nonylbenzoate
2,3-difluoro-4-methoxymethylphenyl 4-nonylbenzoate
2,3-difluoro-4-(but-3-enyl)phenyl 4-nonylbenzoate
2,3-difluoro-4-ethylphenyl 4-propyloxybenzoate
2,3-difluoro-4-propylphenyl 4-propyloxybenzoate
2,3-difluoro-4-butylphenyl 4-propyloxybenzoate
2,3-difluoro-4-pentylphenyl 4-propyloxybenzoate
2,3-difluoro-4-hexylphenyl 4-propyloxybenzoate
2,3-difluoro-4-heptylphenyl 4-propyloxybenzoate
2,3-difluoro-4-octylphenyl 4-propyloxybenzoate
2,3-difluoro-4-nonylphenyl 4-propyloxybenzoate
2,3-difluoro-4-decylphenyl 4-propyloxybenzoate
2,3-difluoro-4-undecylphenyl 4-propyloxybenzoate
2,3-difluoro-4-dodecylphenyl 4-propyloxybenzoate
2,3-difluoro-4-methoxymethylphenyl 4-propyloxybenzoate
2,3-difluoro-4-(but-3-enyl)phenyl 4-propyloxybenzoate
2,3-difluoro-4-ethylphenyl 4-octyloxybenzoate
2,3-difluoro-4-propylphenyl 4-octyloxybenzoate
2,3-difluoro-4-butylphenyl 4-octyloxybenzoate
2,3-difluoro-4-pentylphenyl 4-octyloxybenzoate
2,3-difluoro-4-hexylphenyl 4-octyloxybenzoate
2,3-difluoro-4-heptylphenyl 4-octyloxybenzoate
2,3-difluoro-4-octylphenyl 4-octyloxybenzoate
2,3-difluoro-4-nonylphenyl 4-octyloxybenzoate
2,3-difluoro-4-decylphenyl 4-octyloxybenzoate
2,3-difluoro-4-undecylphenyl 4-octyloxybenzoate
2,3-difluoro-4-dodecylphenyl 4-octyloxybenzoate
2,3-difluoro-4-methoxymethylphenyl 4-octyloxybenzoate
2,3-difluoro-4-(but-3-enyl)phenyl 4-octyloxybenzoate
2,3-difluoro-4-pentylphenyl 4-pentylbenzoate
2,3-difluoro-4-pentylphenyl 4-octylbenzoate
2,3-difluoro-4-pentylphenyl 4-dodecylbenzoate
2,3-difluoro-4-pentylphenyl 4-methyloxybenzoate
2,3-difluoro-4-pentylphenyl 4-ethyloxybenzoate
C 42 N (26) I (monotropic phase transition)
2,3-difluoro-4-pentylphenyl 4-butyloxybenzoate
2,3-difluoro-4-pentylphenyl 4-heptyloxybenzoate
2,3-difluoro-4-pentylphenyl 4-dodecyloxybenzoate

EXAMPLE 2

0.1 mol of 2-fluoro-4-butyloxybenzoic acid (prepared from 3-fluoro-4-cyanophenol by alkylation with butyl bromide/potassium carbonate in dimethylformamide followed by hydrolysis of the nitrile via the imido ester), 0.01 mol of dimethylaminopyridine and 0.1 mol of 2,3-difluoro-4-octylphenol are initially introduced in 150 ml of dichloromethane, a solution of 0.1 mol of dicyclohexylcarbodiimide in 30 ml of dichloromethane is added dropwise at 10° with stirring, and the mixture is subsequently stirred at room temperature for 15 hours. The mixture is filtered through silica gel, the solvent is evaporated and the residue obtained is 2,3-difluoro-4-octylphenyl 2-fluoro-4-butyloxybenzoate.
The following are prepared analogously:
2,3-difluoro-4-ethylphenyl 2-fluoro-4-propylbenzoate
2,3-difluoro-4-propylphenyl 2-fluoro-4-propylbenzoate
2,3-difluoro-4-pentylphenyl 2-fluoro-4-propylbenzoate
2,3-difluoro-4-heptylphenyl 2-fluoro-4-propylbenzoate
2,3-difluoro-4-octylphenyl 2-fluoro-4-propylbenzoate
2,3-difluoro-4-nonylphenyl 2-fluoro-4-propylbenzoate
2,3-difluoro-4-heptoxymethylphenyl 2-fluoro-4-propylbenzoate
2,3-difluoro-4-octoxymethylphenyl 2-fluoro-4-propylbenzoate
2,3-difluoro-4-methoxymethylphenyl 2-fluoro-4-propylbenzoate
2,3-difluoro-4-ethylphenyl 2-fluoro-4-pentylbenzoate
2,3-difluoro-4-propylphenyl 2-fluoro-4-pentylbenzoate
2,3-difluoro-4-pentylphenyl 2-fluoro-4-pentylbenzoate
2,3-difluoro-4-heptylphenyl 2-fluoro-4-pentylbenzoate
2,3-difluoro-4-octylphenyl 2-fluoro-4-pentylbenzoate
2,3-difluoro-4-nonylphenyl 2-fluoro-4-pentylbenzoate
2,3-difluoro-4-heptoxymethylphenyl 2-fluoro-4-pentylbenzoate
2,3-difluoro-4-octoxymethylphenyl 2-fluoro-4-pentylbenzoate
2,3-difluoro-4-methoxymethylphenyl 2-fluoro-4-pentylbenzoate
2,3-difluoro-4-ethylphenyl 2-fluoro-4-heptylbenzoate
2,3-difluoro-4-propylphenyl 2-fluoro-4-heptylbenzoate
2,3-difluoro-4-pentylphenyl 2-fluoro-4-heptylbenzoate
2,3-difluoro-4-heptylphenyl 2-fluoro-4-heptylbenzoate
2,3-difluoro-4-octylphenyl 2-fluoro-4-heptylbenzoate
2,3-difluoro-4-nonylphenyl 2-fluoro-4-heptylbenzoate
2,3-difluoro-4-heptoxymethylphenyl 2-fluoro-4-heptylbenzoate
2,3-difluoro-4-octoxymethylphenyl 2-fluoro-4-heptylbenzoate
2,3-difluoro-4-methoxymethylphenyl 2-fluoro-4-heptylbenzoate
2,3-difluoro-4-propylphenyl 2-fluoro-4-propyloxybenzoate
2,3-difluoro-4-pentylphenyl 2-fluoro-4-propyloxybenzoate
2,3-difluoro-4-heptylphenyl 2-fluoro-4-propyloxybenzoate
2,3-difluoro-4-nonylphenyl 2-fluoro-4-propyloxybenzoate
2,3-difluoro-4-propylphenyl 2-fluoro-4-pentyloxybenzoate
2,3-difluoro-4-pentylphenyl 2-fluoro-4-pentyloxybenzoate
2,3-difluoro-4-heptylphenyl 2-fluoro-4-pentyloxybenzoate
2,3-difluoro-4-nonylphenyl 2-fluoro-4-pentyloxybenzoate
2,3-difluoro-4-propylphenyl 2-fluoro-4-heptyloxybenzoate
2,3-difluoro-4-pentylphenyl 2-fluoro-4-heptyloxybenzoate 2,3-difluoro-4-heptylphenyl 2-fluoro-4-heptyloxybenzoate
2,3-difluoro-4-nonylphenyl 2-fluoro-4-heptyloxybenzoate

EXAMPLE 3

Reaction of 0.1 mol of o-difluorobenzene with butyllithium in the presence of potassium tertiary-butoxide at −90° to −100° in tetrahydrofuran, alkylation of the potassium compound formed with ethoxyethyl bromide/1,3-dimethyltetrahydro-2-(1H)-pyrimidinone (DMPU), remetallation of 2,3-difluoro-4-ethoxyethylbenzene and dropwise addition of a solution of lithium t-butyl-peroxide in ether prepared from 0.12 mol of t-butyl hydroperoxide and 0.12 mol of butyllithium gives 2,3-difluoro-4-ethoxyethylphenol. Esterification with 4-(trans-4-butylcyclohexyl)-benzoyl chloride analogously to Example 1 gives 2,3-difluoro-4-ethoxyethylphenyl 4-(trans-4-butylcyclohexyl)benzoate.

The following are prepared analogously:
2,3-difluoro-4-pentylphenyl 4-(trans-4-ethylcyclohexyl)benzoate
2,3-difluoro-4-pentylphenyl 4-(trans-4-propylcyclohexyl)benzoate
2,3-difluoro-4-pentylphenyl 4-(trans-4-butylcyclohexyl)benzoate
2,3-difluoro-4-pentylphenyl 4-(trans-4-pentylcyclohexyl)benzoate, $T_M=74$, $T_C=174$
2,3-difluoro-4-pentylphenyl 4-(trans-4-heptylcyclohexyl)benzoate
2,3-difluoro-4-pentylphenyl 4-(trans-4-nonylcyclohexyl)benzoate
2,3-difluoro-4-ethylphenyl 4-(4-propylphenyl)benzoate
2,3-difluoro-4-propylphenyl 4-(4-propylphenyl)benzoate
2,3-difluoro-4-pentylphenyl 4-(4-propylphenyl)benzoate
2,3-difluoro-4-heptylphenyl 4-(4-propylphenyl)benzoate
2,3-difluoro-4-decylphenyl 4-(4-propylphenyl)benzoate
2,3-difluoro-4-methoxymethylphenyl 4-(4-propylphenyl)benzoate
2,3-difluoro-4-ethoxymethylphenyl 4-(4-propylphenyl)benzoate
2,3-difluoro-4-(but-3-enyl)phenyl 4-(4-propylphenyl)benzoate
2,3-difluoro-4-ethylphenyl 4-(4-pentylphenyl)benzoate
2,3-difluoro-4-propylphenyl 4-(4-pentylphenyl)benzoate
2,3-difluoro-4-pentylphenyl 4-(4-pentylphenyl)benzoate
2,3-difluoro-4-heptylphenyl 4-(4-pentylphenyl)benzoate
2,3-difluoro-4-decylphenyl 4-(4-pentylphenyl)benzoate
2,3-difluoro-4-methoxymethylphenyl 4-(4-pentylphenyl)benzoate
2,3-difluoro-4-ethoxymethylphenyl 4-(4-pentylphenyl)benzoate
2,3-difluoro-4-(but-3-enyl)phenyl 4-(4-pentylphenyl)benzoate
2,3-difluoro-4-ethylphenyl 4-(4-heptylphenyl)benzoate
2,3-difluoro-4-propylphenyl 4-(4-heptylphenyl)benzoate
2,3-difluoro-4-pentylphenyl 4-(4-heptylphenyl)benzoate
2,3-difluoro-4-heptylphenyl 4-(4-heptylphenyl)benzoate
2,3-difluoro-4-decylphenyl 4-(4-heptylphenyl)benzoate
2,3-difluoro-4-methoxymethylphenyl 4-(4-heptylphenyl)benzoate
2,3-difluoro-4-ethoxymethylphenyl 4-(4-heptylphenyl)benzoate
2,3-difluoro-4-(but-3-enyl)phenyl 4-(4-heptylphenyl)benzoate
2,3-difluoro-4-propylphenyl 4-(4-propyloxyphenyl)benzoate
2,3-difluoro-4-propylphenyl 4-(4-pentyloxyphenyl)benzoate
2,3-difluoro-4-propylphenyl 4-(4-heptyloxyphenyl)benzoate
2,3-difluoro-4-propylphenyl 4-(4-nonyloxyphenyl)benzoate
2,3-difluoro-4-propylphenyl 4-(4-undecyloxyphenyl)benzoate
2,3-difluoro-4-pentylphenyl 4-(4-propyloxyphenyl)benzoate
2,3-difluoro-4-pentylphenyl 4-(4-pentyloxyphenyl)benzoate
2,3-difluoro-4-pentylphenyl 4-(4-heptyloxyphenyl)benzoate
2,3-difluoro-4-pentylphenyl 4-(4-nonyloxyphenyl)benzoate
2,3-difluoro-4-pentylphenyl 4-(4-undecyloxyphenyl)benzoate
2,3-difluoro-4-heptylphenyl 4-(4-propyloxyphenyl)benzoate
2,3-difluoro-4-heptylphenyl 4-(4-pentyloxyphenyl)benzoate
2,3-difluoro-4-heptylphenyl 4-(4-heptyloxyphenyl)benzoate
2,3-difluoro-4-heptylphenyl 4-(4-nonyloxyphenyl)benzoate
2,3-difluoro-4-heptylphenyl 4-(4-undecyloxyphenyl)benzoate
2,3-difluoro-4-pentylphenyl 4-(2,3-difluoro-4-pentylphenyl)benzoate
2,3-difluoro-4-pentylphenyl 4-(2,3-difluoro-4-heptylphenyl)benzoate
2,3-difluoro-4-pentylphenyl 4-(2,3-difluoro-4-nonylphenyl)benzoate
2,3-difluoro-4-propylphenyl 2,3-difluoro-4-(4-pentylphenyl)benzoate
2,3-difluoro-4-propylphenyl 2,3-difluoro-4-(4-propylphenyl)benzoate
2,3-difluoro-4-propylphenyl 2,3-difluoro-4-(4-heptylphenyl)benzoate
2,3-difluoro-4-propylphenyl 2,3-difluoro-4-(4-propyloxyphenyl)benzoate
2,3-difluoro-4-propylphenyl 2,3-difluoro-4-(4-pentyloxyphenyl)benzoate
2,3-difluoro-4-propylphenyl 2,3-difluoro-4-(4-pentylphenyl)benzoate
2,3-difluoro-4-propylphenyl 2,3-difluoro-4-(4-heptylphenyl)benzoate
2,3-difluoro-4-propylphenyl 4-(3-fluoro-4-pentylphenyl)benzoate
2,3-difluoro-4-pentylphenyl 4-(3-fluoro-4-pentylphenyl)benzoate
2,3-difluoro-4-heptylphenyl 4-(3-fluoro-4-pentylphenyl)benzoate
2,3-difluoro-4-heptylphenyl 4-(3-fluoro-4-heptylphenyl)benzoate
2,3-difluoro-4-pentylphenyl 4-(3-fluoro-4-pentyloxyphenyl)benzoate The examples which follow relate to liquid-crystalline media according to the invention:

EXAMPLE A

A liquid-crystalline medium comprising
9% of 4-octyloxyphenyl 4-octyloxybenzoate,
12% of 4-nonyloxyphenyl 4-octyloxybenzoate,
8% of 4-nonyloxyphenyl 4-decyloxybenzoate,
10% of 4-decyloxyphenyl 4-decyloxybenzoate,
6% of 2,3-difluoro-4-octylphenyl 4-octyloxybenzoate,
8% of 2,3-difluoro-4-decylphenyl 4-octyloxybenzoate,
4% of 2,3-difluoro-4-octylphenyl 2-fluoro-4-octyloxybenzoate,
15% of 4'-heptyloxybiphenyl-4-yl 4-octyloxybenzoate,
18% of 4'-octyloxybiphenyl-4-yl 4-octyloxybenzoate and
10% of optically active butyl 2-[p-(5-nonylpyrimidin-2-yl)-phenoxy]propionate
exhibits $S_c^*$ 59 $S_A$ 67 Ch 78 I and a spontaneous polarization of 9 nc/cm² at room temperature.

EXAMPLE B

A liquid-crystalline medium comprising
15% of p-trans-4-propylcyclohexylbenzonitrile,
27% of trans-1-p-ethylphenyl-4-propylcyclohexane,
10% of trans-1-p-ethoxyphenyl-4-propylcyclohexane,
7% of 4-cyano-4'-(trans-4-pentylcyclohexyl)biphenyl,
9% of 4-ethyl-4'-(trans-4-propylcyclohexyl)biphenyl,
8% of 4-ethyl-4'-(trans-4-pentylcyclohexyl)biphenyl,
10% of 4-(trans-4-pentylcyclohexyl-4'-(trans-4-propylcyclohexyl)biphenyl,
8% of 2,3-difluoro-4-ethoxyethylphenyl-4-(trans-4-butylcyclohexyl)benzoate and
6% of p-propylphenyl p-trans-4-pentylcyclohexylbenzoate
is a nematic wide range mixture having very lower viscosity and good multiplex properties.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 2,3-difluorophenol derivative of the formula

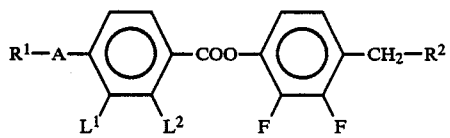

wherein
$R^1$ and $R^2$, in each case independently of one another, are an alkyl group having 1–15 C atoms, wherein one or each $CH_2$ group of two nonadjacent $CH_2$ groups can be replaced by —O—, —CO—, —CH=CH— or —C≡C—;
A is 1,4-phenylene which is unsubstituted or substituted by one or two fluorines, or is trans-1,4-cyclohexylene or a single bond; and
$L^1$ and $L^2$, in each case independently of one another, are H or F.

2. A compound according to claim 1, of the subformula Ia $$R^1\text{—Phe—COO—PheF}_2\text{—CH}_2R^2 \qquad Ia$$

wherein
Phe is a 1,4-phenylene group and
PheF₂ is a group of the part formula

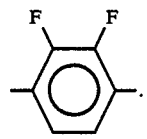

3. A compound according to claim 1, of the subformula Ib $$R^1\text{—Phe—Phe—COO—PheF}_2\text{—CH}_2R^2 \qquad Ib$$

wherein
Phe is a 1,4-phenylene group and
PheF₂ is a group of the part formula

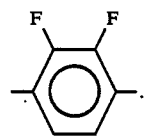

4. A compound according to claim 1, of the subformula Ic $$R^1\text{—Cyc—Phe—COO—PheF}_2\text{—CH}_2R^2 \qquad Ic$$

wherein
Phe is a 1,4-phenylene group;
Cyc is a 1,4-cyclohexylene group; and
PheF₂ is a group of the part formula

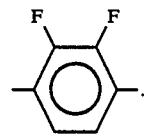

5. A compound according to claim 1, wherein $R^1$ and/or $R^2$ are alkyl or alkoxy.

6. A compound according to claim 1, wherein one of the radicals $R^1$ and $R^2$ is alkenyl or oxaalkyl.

7. A compound according to claim 1, wherein A is unsubstituted 1,4-phenylene or is 1,4-cyclohexylene.

8. A compound according to claim 1, wherein $R^1$ and $R^2$ each have 2–12 C atoms.

9. A compound according to claim 1, wherein $R^1$ and $R^2$ each have 3–10 C atoms.

10. A compound according to claim 1, wherein in the groups $R^1$ and $R^2$ only one $CH_2$ group is replaced by —O— or —CH=CH—.

11. A compound according to claim 1, wherein one or each $CH_2$ group of two nonadjacent $CH_2$ groups of $R^1$ and $R^2$ is replaced by an O atom.

12. A compound according to claim 1, wherein $R^1$ and/or $R^2$ are alkyl radicals in which one $CH_2$ group is replaced by —CH=CH— and the radicals are in the trans form.

13. A compound according to claim 12, wherein $R^1$ and/or $R^2$ is a straight chain alkenyl radical having 2–10 C atoms.

14. A compound according to claim 1, wherein $R^1$ and/or $R^2$ is a straight chain radical.

15. A compound according to claim 1, wherein $R^1$ and/or $R^2$ is a branched radical having not more than 1 chain branch.

16. A liquid-crystalline medium having at least two liquid-crystalline components, comprising at least one compound according to claim 1.

17. An electrooptical display element, comprising a liquid-crystalline medium according to claim 16, as the dielectric.

* * * * *